United States Patent
Xi et al.

(10) Patent No.: US 12,511,344 B2
(45) Date of Patent: Dec. 30, 2025

(54) FUSING OPERATORS FOR NEURAL NETWORK HARDWARE ACCELERATORS

(71) Applicant: Microsoft Technology Licensing, LLC, Redmond, WA (US)

(72) Inventors: Jinwen Xi, Sunnyvale, CA (US); Eric S Chung, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1043 days.

(21) Appl. No.: 17/560,061

(22) Filed: Dec. 22, 2021

(65) Prior Publication Data

US 2023/0195833 A1   Jun. 22, 2023

(51) Int. Cl.
*G06F 17/16*   (2006.01)
*G06N 3/04*    (2023.01)

(52) U.S. Cl.
CPC .............. *G06F 17/16* (2013.01); *G06N 3/04* (2013.01)

(58) Field of Classification Search
CPC ..................................................... G06F 30/337
See application file for complete search history.

(56) References Cited

U.S. PATENT DOCUMENTS

2019/0244095 A1* 8/2019 Huang .................... G06N 3/105
2022/0067513 A1* 3/2022 Stevens .................. G06N 3/045

OTHER PUBLICATIONS

E. Cheever, "Review of Arrays, Vectors and Matrices", Linear Physical Systems Analysis Web Site, Swarthmore College, retrieved Jun. 22, 2021. (Year: 2021).*
"Softmax function", Wikipedia.org, retrieved Dec. 6, 2021. (Year: 2021).*
Jeong, et al., "Accelerating Multi-Model Inference by Merging DNNs of Different Weights", In Repository of arXiv:2009.13062v1, Sep. 28, 2020, 15 Pages.
Kao, et al., "ATTACC the Quadratic Bottleneck of Attention Layers", In Repository of arXiv:2110.11299v1, Jul. 13, 2021, 14 Pages.
Li, et al., "A High Performance FPGA-Based Accelerator for Large-Scale Convolutional Neural Networks", In Proceedings of 26th International Conference on Field Programmable Logic and Applications, Aug. 29, 2016, 9 Pages.
"International Search Report and Written Opinion Issued in PCT Application No. PCT/US22/044772", Mailed Date: Feb. 6, 2023, 13 Pages.

* cited by examiner

*Primary Examiner* — Andrew Caldwell
*Assistant Examiner* — Jonathan David Warner
(74) *Attorney, Agent, or Firm* — Holzer Patel Drennan

(57) ABSTRACT

Embodiments of the present disclosure include systems and methods for fusing operators for neural network hardware accelerators. A plurality of vector multiplication operations in a data path of a mapping function included in a neural network are identified. The plurality of vector multiplication operations are combined into a single vector multiplication operation in the data path of the mapping function. A programmable integrated circuit (IC) is programmed to implement the mapping function of the neural network

18 Claims, 9 Drawing Sheets

FUSING OPERATORS FOR NEURAL NETWORK HARDWARE ACCELERATORS

BACKGROUND

The present disclosure relates to computing hardware. More particularly, the present disclosure relates to techniques for training neural networks and using neural networks for inference.

A neural network is a machine learning model used for a variety of different applications (e.g., image classification, computer vision, natural language processing, speech recognition, writing recognition, etc.). A neural network may be trained for a particular purpose by running datasets through it, comparing results from the neural network to known results, and updating the network based on the differences.

BRIEF DESCRIPTION OF THE DRAWINGS

Various embodiments of the present disclosure are illustrated by way of example and not limitation in the figures of the accompanying drawings.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Described here are techniques for fusing operators for neural network hardware accelerators. In some embodiments, a neural network model is implemented on a set of neural network hardware accelerators. The neural network model includes one more mapping functions that is each configured to receive a first set of values and map them to a second set of values. An example of a mapping function is a softmax function. When implementing the mapping function on a hardware accelerator, logical blocks in the data path of the mapping function can be analyzed. In some cases, multiple operators can be identified to be fused together (e.g., merged) without changing the functionality of the mapping function. For instance, several vector multiplication blocks may be identified to be fused together. The data path of the mapping function can then be modified by combining the identified vector multiplication blocks into a single vector multiplication block. This technique can be applied in multiple times to the data path of the mapping function (e.g., different sets of vector multiplication blocks can each be combined into single multiplication blocks). In addition, the technique may be applied to each of the mapping functions in the neural network model.

The techniques described in the present application provide a number of benefits and advantages over conventional methods of training and using neural network models. For example, fusing operators in a data path of a mapping functions included in a neural network model without changing the functionality of the mapping function increases the amount of computing density utilized in the hardware accelerator that implements the mapping function since the area of the hardware accelerator utilized by the mapping is reduced. This allows larger and/or more complex neural networks to be implemented on the hardware accelerator. Conventional approaches to implementing mapping functions on hardware accelerators may have a lower computing density.

Figure 1:
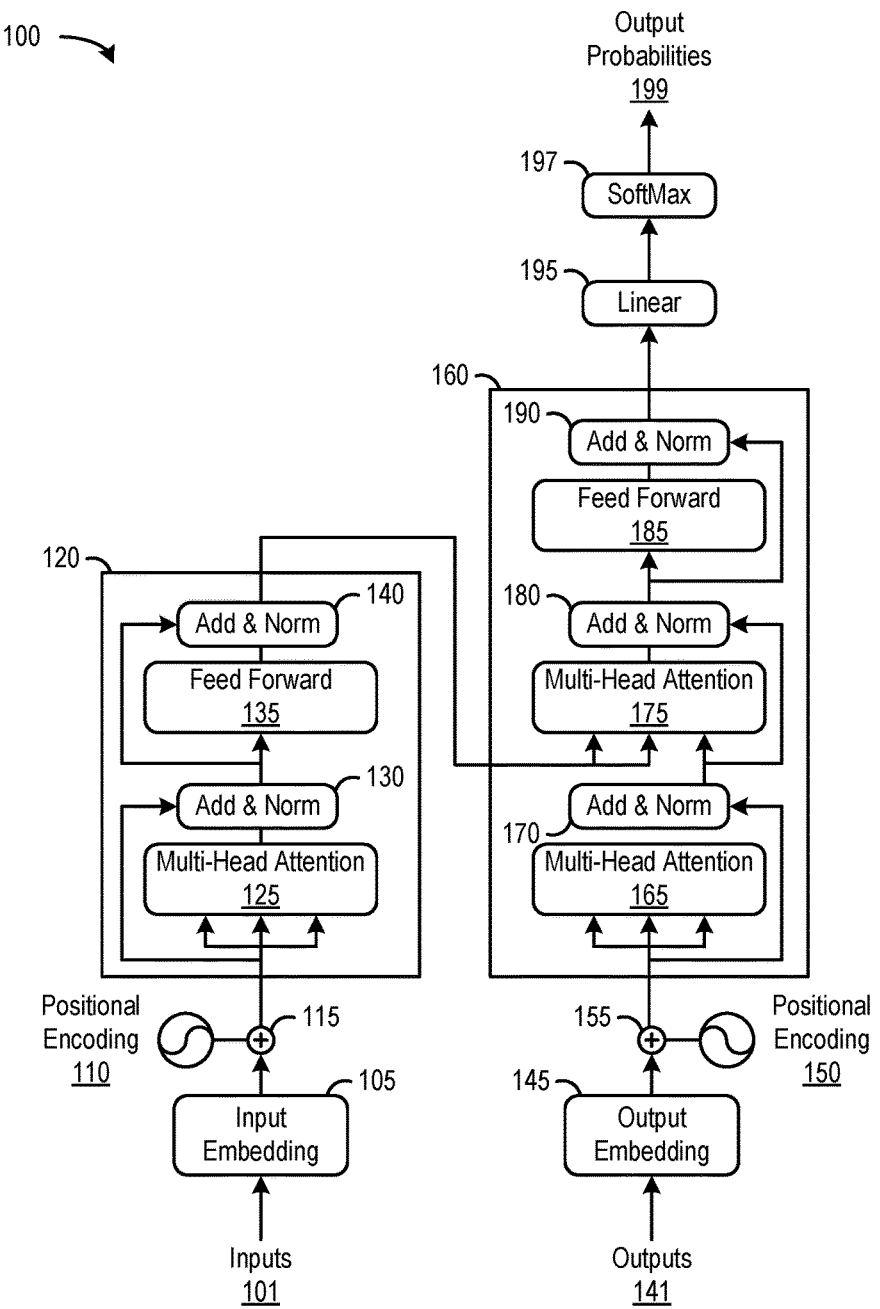
FIG. 1 illustrates an architecture of a transformer layer in a transformer neural network model according to some embodiments.

FIG. 1 illustrates an architecture of a transformer layer 100 in a transformer neural network model according to some embodiments. One of ordinary skill in the art will understand that one or more transformer layers similar to transformer layer 100 may be used to implement a transformer neural network model. As shown, transformer layer 100 includes encoder 120 decoder 160, linear layer 195, and softmax 197. In this example, inputs 101 are a sequence (e.g., a set of sentences) of tokens (e.g., words). Input embedding 105 is configured to determine a token embedding (e.g., a word embedding) for each token in inputs 101 using an embedding space generated from a corpus of tokens (e.g., a vocabulary of words). In some embodiments, a token embedding space maps tokens in the corpus, which has many dimensions, to numeric representations (e.g., vectors) having a lower number of dimensions.

To determine a token embedding for a token, input embedding 105 converts the token to a numeric representation using the embedding space generated. The numeric representation of a token can be a vector of 128, 256, 1024, 2048, 4096, etc. floating-point numbers. In some embodiments, the token embedding space is implemented as a table with entries that map tokens to their corresponding numeric representations. To determine the numeric representation of a token in some such embodiments, input embedding 105 performs a look up on the table to find an entry that matches the token and converts the token to the numeric representation specified by the entry. Once input embedding 105 determines numeric representations for each token in inputs 101, input embedding 105 sends them in the form of a matrix to matrix addition operation 115.

In some embodiments, each token in inputs 101 has an associated position value. A position value may represent the relative position of a particular token in a sequence of tokens. Positional encoding 110 are encodings of the position values of the tokens in inputs 101. In some embodiments, a position encoding is determined for a position value by converting the position value to a numeric representation using an embedding space generated from a corpus of position values. The numeric representation of a position value can be a vector of 128, 256, 1024, 2048, 4096, etc.

floating-point numbers. Positional encodings 110 are stored in a matrix and provided as input to matrix addition operation 115. Matrix addition operation 115 performs a matrix addition operation on the matrix of positional encoding 110 and the matrix of token embeddings determined from inputs 101 and sends the sum to encoder 120.

Upon receiving the matrix from matrix addition operation 115, encoder 120 provides the matrix as three different inputs to multi-head attention 125. Multi-head attention 125 determines how related a particular input token is relative to other input tokens based on the input embeddings and positional encodings. Multi-head attention 125 outputs these determinations in the form of matrices provided to addition and normalization 130. Addition and normalization 130 performs layer normalization operations on the matrices received from multi-head attention 125 and the original received matrix. Then, addition and normalization 130 sends output matrices to feed forward 135. Feed forward 135 processes each of the matrices through a feed forward neural network. The output matrices from feed forward 135 are provided to addition and normalization 140. Addition and normalization 140 performs layer normalization operations on the matrices received from feed forward 135 and the matrices output from addition and normalization 130. Addition and normalization 140 outputs matrices to multi-head attention 175 of decoder 160.

For this example, outputs 141 are a sequence (e.g., a set of sentences) of tokens (e.g., words). To train transformer layer 100 in a transformer neural network model, outputs 141 can be the expected outputs for the given inputs 101. Output embedding 145 is configured to determine a token embedding (e.g., a word embedding) for each token in outputs 141 using an embedding space generated from a corpus of tokens (e.g., a vocabulary of words). In some embodiments, the same token embedding space maps used for input embedding 105 are used for output embedding 145. Additionally, output embedding 145 determines a token embedding for a token in the same manner described above that input embedding 105 determines a token embedding for a token. After output embedding 145 determines numeric representations for each token in outputs 141, output embedding 145 sends them in the form of a matrix to matrix addition operation 155.

Similar to inputs 101, each token in outputs 141 may have an associated position value. Positional encoding 150 are encodings of the position values of the tokens in outputs 141. In some embodiments, a position encoding is determined for a position value by converting the position value to a numeric representation using an embedding space generated from a corpus of position values. The numeric representation of a position value can be a vector of 128, 256, 1024, 2048, 4096, etc. floating-point numbers. Positional encodings 150 are stored in a matrix and provided as input to matrix addition operation 155. Matrix addition operation 155 performs a matrix addition operation on the matrix of positional encoding 150 and the matrix of token embeddings determined from outputs 141 and sends the sum to decoder 160.

Decoder 160 provides the received matrix as three different inputs to multi-head attention 165. Multi-head attention 165 is similar to multi-head attention 125 in that multi-head attention 165 determines how related a particular output token is relative to other output tokens based on the output embeddings and positional encodings. Multi-head attention 165 outputs these determinations in the form of matrices provided to addition and normalization 170. Addition and normalization 170 performs layer normalization operations on the matrices received from multi-head attention 165 and the original matrix that decoder 160 received. Next, addition and normalization 170 sends output matrices to multi-head attention 175. Multi-head attention is similar to multi-head attention 165 except multi-head attention 175 operates on the matrices received from addition and normalization 170 and two different instances of the matrices received from encoder 120. Multi-head attention 175 sends its output matrices to addition and normalization 180, which performs layer normalization operations on these three sets of matrices. The output of addition and normalization 180 is sent to feed forward 185.

Feed forward 185 processes each of the matrices through a feed forward neural network. The matrices generated by feed forward 135 are provided to addition and normalization 190. Addition and normalization 190 performs layer normalization operations on the matrices received from feed forward 185 and the matrices output from addition and normalization 180. Addition and normalization 190 outputs matrices to linear layer 195. Based on the received matrices, linear layer 195 performs linear transformation operations to generate a set of output matrices, which linear layer 195 sends to softmax 197.

Softmax 197 is configured to take, as input, a vector of real numbers and normalize it into a probability distribution that includes probabilities proportional to the exponentials of the input numbers. In some embodiments, the input vector includes real numbers that can be negative, greater than 1, etc. The sum of the real numbers might not be equal to one. However, after softmax 197 is applied, each component will be a value in the interval [0,1]. In addition, the components will add up to 1. That is, softmax 197 is a function that maps a set of values to another set of corresponding values. As illustrated in FIG. 1, softmax 197 generates output probabilities 199.

Figure 2:
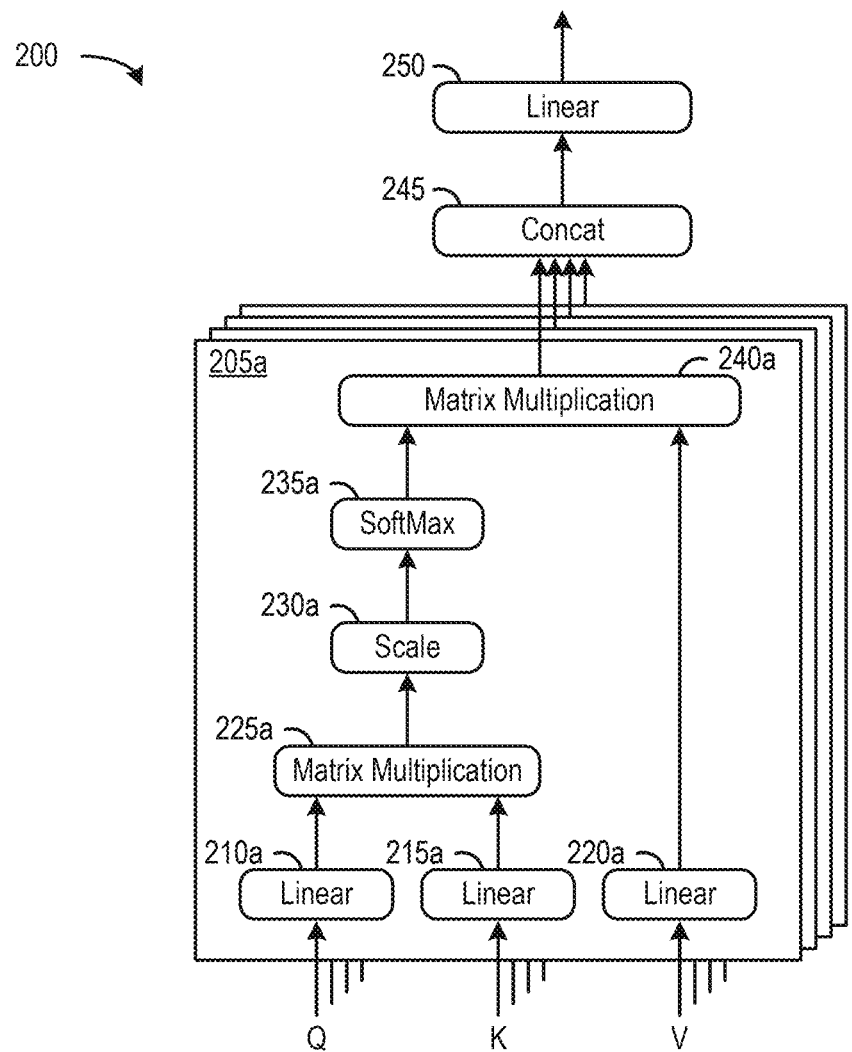
FIG. 2 illustrates an architecture of a multi-head attention according to some embodiments.

FIG. 2 illustrates an architecture of a multi-head attention 200 according to some embodiments. In some embodiments, multi-head attention 200 can be used to implement multi-head attention 125, 165, and 175. As depicted in FIG. 2, multi-head attention 200 includes four self-attention layer 205a-d, concatenation 245, and linear layer 250. One of ordinary skill in the art will appreciate that different embodiments of multi-head attention 200 can include different numbers of self-attention layers.

In this example, each of the self-attention layers 205a-d include the same elements. Therefore, only self-attention layer 205a will be explained. As shown, self-attention layer 205a includes linear layers 210a-220a, matrix multiplication 225a, scale 230a, softmax 235a, and matrix multiplication 240a. Self-attention layer 205a receives three different matrices Q, K, and V. Each of the linear layers 210a, 215a, and 220a, receives one of the matrices, Q, K, and V, and performs a set of linear transformation operations on its corresponding matrix. Linear layers 210a and 215a send their output matrices to matrix multiplication 225a. Linear layer 220a sends its output matrix to matrix multiplication 240a.

Matrix multiplication 225a performs a set of matrix multiplication operations on matrices receives from linear layers 210a and 215a. Matrix multiplication 225a sends the product of the multiplication operation to scale 230a. Scale 230a performs scaling operations on the matrix. For instance, scale 230a may scale the matrix it received by dividing each element in the matrix by the square root of the value of the hidden size of the transformer neural network model. This can be expressed by the following equation $$X_1 = \frac{X_0}{\sqrt{H}}$$

where H is the hidden size, Xo is the input matrix, and Xi and the output matrix. After scaling the matrix, scaling 230*a* sends the scaled matrix to softmax 235*a*.

For this example, softmax 235*a* performs a similar operation as softmax 197, which is described above by reference to FIG. 1, except softmax 235*a* also performs some additional processing. The core softmax function is expressed in the following equation (2):

$$Y_0 = \begin{bmatrix} \frac{e^{x1_{0,0}-x1_{0,max}}}{\sum_{j=0}^{Lseq-1} e^{x1_{0,j}-x1_{0,max}}} & \frac{e^{x1_{0,1}-x1_{0,max}}}{\sum_{j=0}^{Lseq-1} e^{x1_{0,j}-x1_{0,max}}} & \cdots & \frac{e^{x1_{0,Lseq-1}-x1_{0,max}}}{\sum_{j=0}^{Lseq-1} e^{x1_{0,j}-x1_{0,max}}} \\ \frac{e^{x1_{1,0}-x1_{1,max}}}{\sum_{j=0}^{Lseq-1} e^{x1_{1,j}-x1_{1,max}}} & \frac{e^{x1_{1,1}-x1_{1,max}}}{\sum_{j=0}^{Lseq-1} e^{x1_{1,j}-x1_{1,max}}} & \cdots & \frac{e^{x1_{1,Lseq-1}-x1_{1,max}}}{\sum_{j=0}^{Lseq-1} e^{x1_{1,j}-x1_{1,max}}} \\ \frac{(e^{xLseq-1,0}-xLseq-1,max}}{\sum_{j=0}^{Lseq-1} e^{x1_{Lseq-1,j}-x1_{Lseq-1,max}}} & \frac{e^{xLseq-1,0-xLseq-1,max}}{\sum_{j=0}^{Lseq-1} e^{x1_{Lseq-1,j}-x1_{Lseq-1,max}}} & \cdots & \frac{e^{xLseq-1,0-xLseq-1,max}}{\sum_{j=0}^{Lseq-1} e^{x1_{Lseq-1,j}-x1_{Lseq-1,max}}} \end{bmatrix}$$

where $L_{seq}$ is the sequence length representing the size of the sequences (e.g., sentences) that the transformer neural network model can comprehend, $x1_{i,max}$ is the maximum value of the $i^{th}$ row of vector x1, and $Y_0$ is the output matrix. The additional processing performed by softmax 235*a* is expressed by the following equation (3):

$Y_1 = f2(Y_0, \text{dropout\_ratio}, \text{dropout\_seed})$ for each element $y_{i,j} = (\text{rand}() < \text{drop}_{ratio})? \ 0.0 : y_{i,j}$
where rand( ) generates a pseudo random data sequence with uniform distribution by a random seed dropout seed. In addition, post-dropout scaling is performed using the following equation (4):

$Y = Y_1/(1-\text{dropout\_ratio})$ where dropout_ratio∈ [0, 1) is the percentage of tensors that will be thrown away and Y is the vector output by softmax 235*a*. Softmax 235*a* processes each vector in this manner and sends its output vectors (e.g., a matrix) to matrix multiplication 240*a*. Once matrix multiplication 240*a* receives the matrix from softmax 235*a* and the matrix from linear layer 220*a*, matrix multiplication 240*a* performs a set of matrix multiplication operations on them. The product of the set of matrix multiplication operations are output to concatenation 245.

After receiving matrices from each of the self-attention layers 205*a-d*, concatenation 245 concatenates the matrices together and sends the concatenated matrix to linear layer 250. Linear layer 250 performs linear transformation operations on the matrix received from concatenation 245 and then outputs a transformed matrix.

Figure 3:
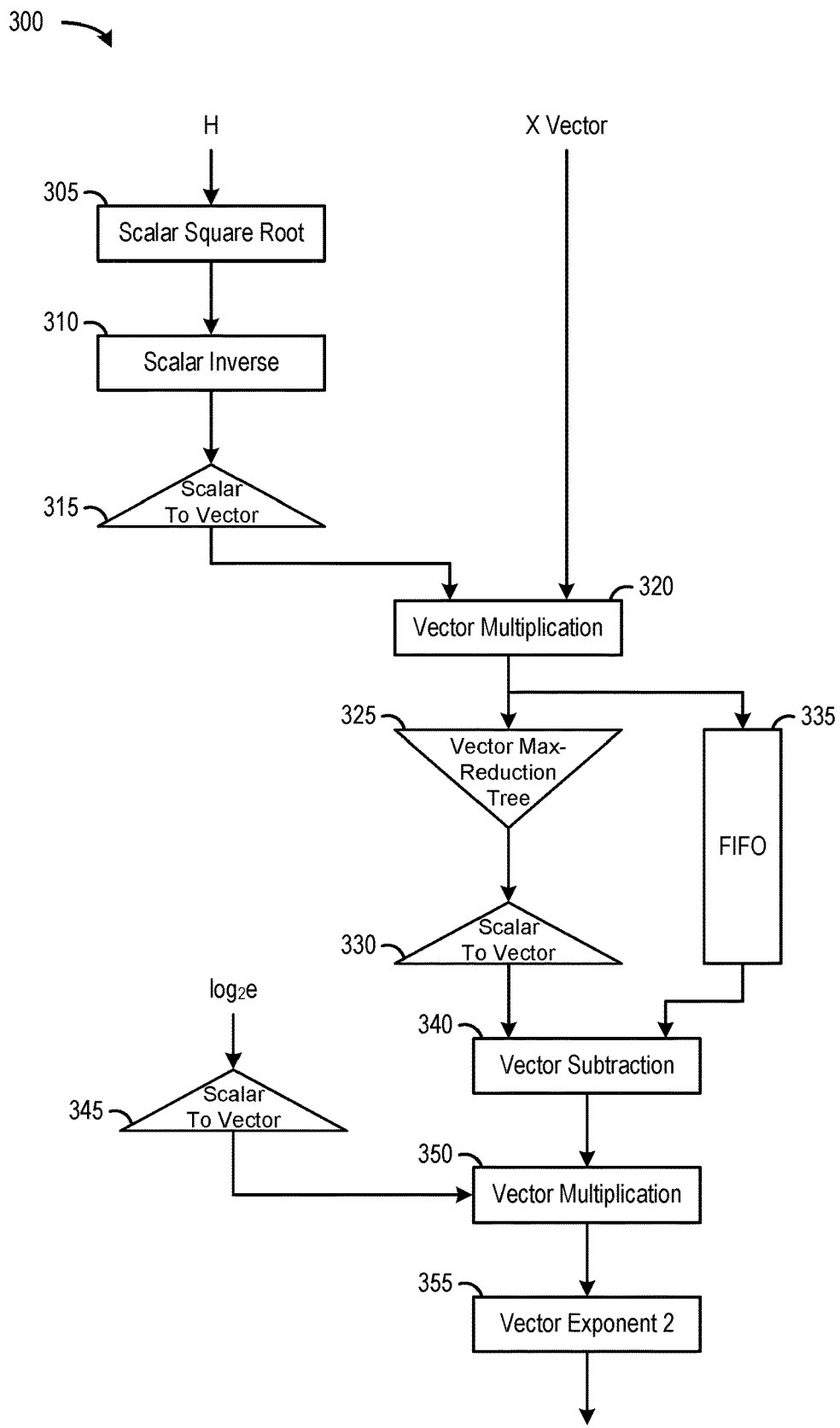
FIG. 3 illustrates a portion of a data path of a softmax function according to some embodiments.

FIG. 3 illustrates a portion of a data path 300 of a softmax function according to some embodiments. In some embodiments, data path 300 may be a data path for a scaling 230 and a portion of a corresponding softmax 235. The softmax function is configured to process one vector. Each element can be determined using the following formula (5):

$$Y_{0,i,j} = \frac{e^{x1_{i,j}-x1_{i,max}}}{\sum_{j=0}^{Lseq-1} e^{x1_{i,j}-x1_{i,max}}}$$

where $x1_{i,max}$ is the maximum value of the $i^{th}$ row of vector x1, which is the scaled version of vector x0 by a constant vector of [1/sqrt(H), 1/sqrt(H), . . . 1/sqrt(H)], and $Y_{0,i,j}$ is the softmax value for element in the $i^{th}$ row and the $j^{th}$ column of $Y_0$. The exponential of x can be calculated by the 2's power of ($\log_2 e * x$). In some embodiments, it is more efficient to implement the exponential of x as the 2's power of ($\log_2 e * x$) on hardware (e.g., a programmable field gate array (FPGA) compared to implementing the exponential of x as the exponential of x. Therefore, formula (5) can be rewritten as the following formula (6):

$$\frac{e^{x1_{i,j}-x1_{i,max}}}{\sum_{j=0}^{Lseq-1} e^{x1_{i,j}-x1_{i,max}}} =$$

$$\frac{2^{\log 2e \cdot (x1_{i,j}-x1_{i,max})}}{\sum_{j=0}^{Lseq-1} 2^{\log 2e \cdot (x1_{i,j}-x1_{i,max})}} = \frac{2^{\log 2e \cdot (x_{i,j}/\sqrt{H}-x_{i,max}/\sqrt{H})}}{\sum_{j=0}^{Lseq-1} 2^{\log 2e \cdot (x_{i,j}/\sqrt{H}-x_{i,max}/\sqrt{H})}}$$

Here, data path 300 implements how the numerator is determined in formula (6). As illustrated in FIG. 3, data path 300 includes scalar square root 305, scalar inverse 310, scalar to vector 315, vector multiplication 320, vector max-reduction tree 325, scalar to vector 330, first in, first out (FIFO) buffer 335, vector subtraction 340, scalar to vector 345, vector multiplication 350, and vector exponent 2 355. In this example, scalar square root 305, scalar inverse 310, and scalar to vector 315 implement scaling 230 while vector multiplication 320, vector max-reduction tree 325, scalar to vector 330, FIFO buffer 335, vector subtraction 340, scalar to vector 345, vector multiplication 350, and vector exponent 2 355 implement a portion of softmax 235.

As shown, scalar square root 305 receives the hidden size H, performs a square root operation on the hidden size H, and outputs the results to scalar inverse 310. Scalar inverse 310 performs an inverse operation to produce a value of 1/$\sqrt{H}$. Scalar inverse 310 sends this value to scalar to vector 315. Here, scalar to vector 315 generates a vector having the same size as the input vector, X Vector. Each element in the generated vector has the value received from scalar inverse 310. Scalar to vector 315 sends the generated vector to vector multiplication 320.

Vector multiplication 320 receives input vector, X Vector, and the vector from scalar to vector 315. Then, vector multiplication 320 performs a vector multiplication operation on these vectors. The result is a vector where each element in X Vector divided by the square root of the hidden size H. The product of vector multiplication 320 is sent to vector max-reduction tree 325 and FIFO buffer 335. Vector max-reduction tree 325 determines the element with the highest value in the vector received from vector multiplication 320 and sends the element to scalar to vector 320. Scalar to vector 320 generates a vector having the same size as the input vector, X Vector. Each element in the generated vector contains the element determined to have the highest value. Both scalar to vector 320 sends their respective vectors to vector subtraction 340.

When vector subtraction 340 receives the vectors from scalar to vector 330 and FIFO buffer 335, vector subtraction 340 performs a vector subtraction operation by subtracting each element in the vector received from scalar to vector 325 from the corresponding element in the vector received from FIFO buffer 335. Vector subtraction 340 sends the difference vector to vector multiplication 350. A value of $\log_2 e$ is provided as input to scalar to vector 345, which generates a vector having the same size as the input vector, X Vector. Each element in the generated vector has the value of $\log_2 e$. Scalar to vector 345 sends the generated vector to vector multiplication 350. Upon receiving vectors from scalar to vector 345 and vector subtraction 340, vector multiplication 350 performs a vector multiplication operation on them. The product vector is sent to vector exponent 2 335. Vector exponent 2 335 performs a base 2 exponential operation on each element in the vector received from vector multiplication 350.

Figure 4:
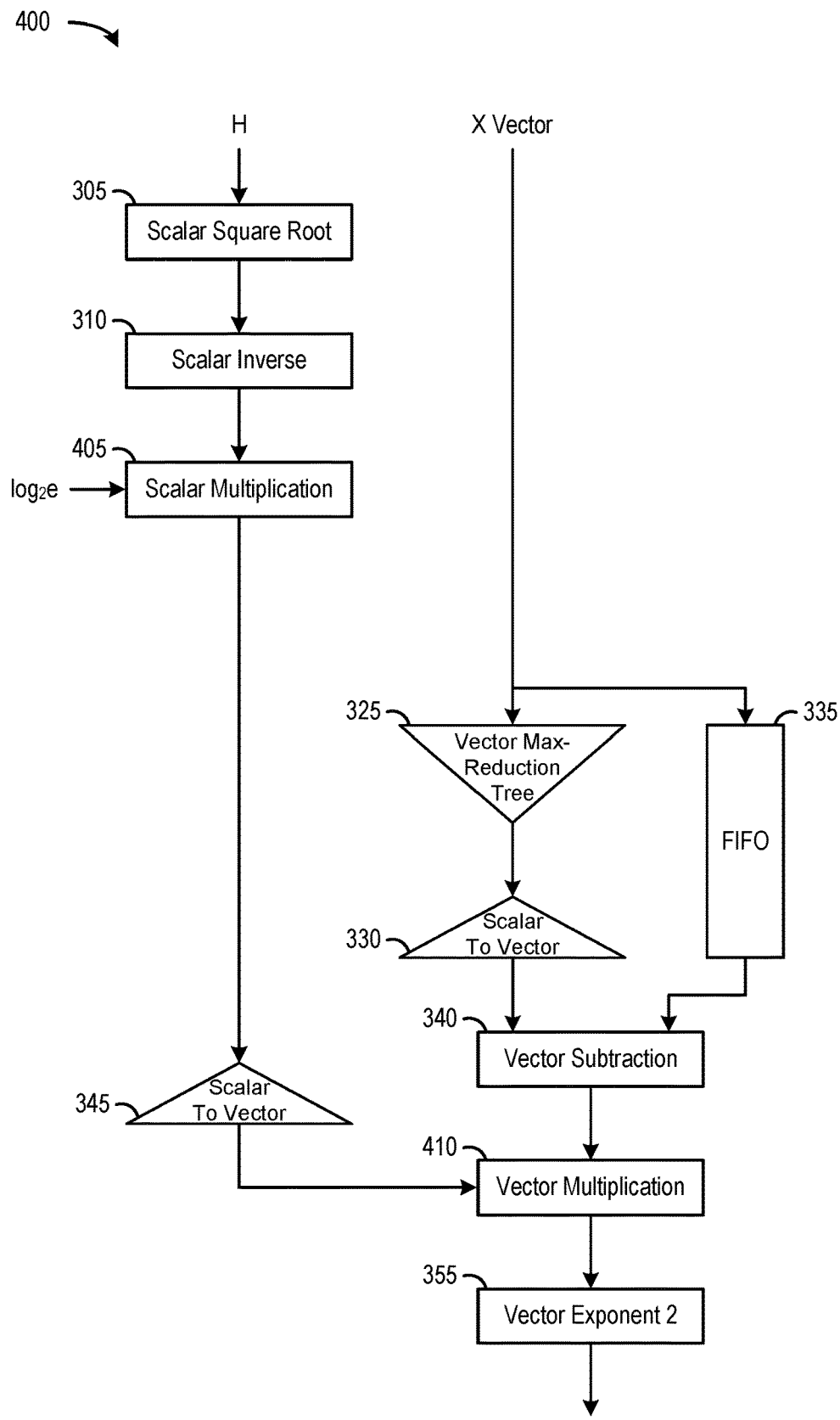
FIG. 4 illustrates the portion of the data path illustrated in FIG. 3 after an operator fusion technique is applied according to some embodiments.

FIG. 4 illustrates the portion of data path 300 after an operator fusion technique is applied to it according to some embodiments. Referring back to formula (6), it can be further rewritten as the following formula (7):

$$\frac{2^{\log 2e \cdot (x_{i,j}/\sqrt{H} - x_{i,max}/\sqrt{H})}}{\sum_{j=0}^{Lseq-1} 2^{\log 2e \cdot (x_{i,j}/\sqrt{H} - x_{i,max}/\sqrt{H})}} = \frac{2^{\frac{\log 2e}{\sqrt{H}} (x_{i,j} - x_{i,max})}}{\sum_{j=0}^{Lseq-1} 2^{\frac{\log 2e}{\sqrt{H}} (x_{i,j} - x_{i,max})}}$$

As shown in formula (7), two vector multiplication operations (a first vector multiplication operation multiplying log 2e and a second vector multiplication operation multiplying $1/\sqrt{H}$) can be fused into a single vector multiplication operation. This single vector multiplication multiplies the coefficient of $\log_2 e/\sqrt{H}$. Because the hidden size H is unchanged during the training process, it can be treated as a constant value.

As shown, data path 400 includes scalar square root 305, scalar inverse 310, scalar multiplication 405, vector max-reduction tree 325, scalar to vector 330, first in, first out (FIFO) buffer 335, vector subtraction 340, scalar to vector 345, vector multiplication 350, and vector exponent 2 355. Data path 400 is similar to data path 300 except for a few modifications. First, scalar to vector 315 has been replaced with scalar multiplication 405. For this example, scalar multiplication 405 receives the inverse of the square root of the hidden size H (i.e., $1/\sqrt{H}$) from scalar inverse 310 and the value $\log_2 e$ and performs a scalar multiplication of the two values. Then, scalar multiplication 405 provides the product as an input to scalar to vector 345. Second, vector multiplication 320 and vector multiplication 350 have been combined into a single vector multiplication 410. Here, vector multiplication 410 performs a set of vector multiplication operations using the difference vector received from vector subtraction 340 and the scaled vector received from scaled to vector 345. The result of the set of vector multiplication operations is sent to vector exponent 2 355.

Even though modifications were made to data path 300 to produce data path 400, data path 400 is functionally identical to data path 300. That is, applying the operator fusing technique does not change the set of output values generated by data path 400 for a given set of input values compared to the set of output values generated by data path 300 for the same given set of input values. Moreover, implementing data path 400 on hardware (e.g., an application-specific integrated circuit (ASIC), an FPGA, etc.) increases the computing density compared to implementing data path 300 on the same hardware since implementing data path 400 reduces the area utilized on the hardware. In some embodiments where the hardware is an FPGA, data path 400 can be implemented on the FPGA by using a software application operating on a computing device to program data path 400 onto the FPGA.

Figure 5:
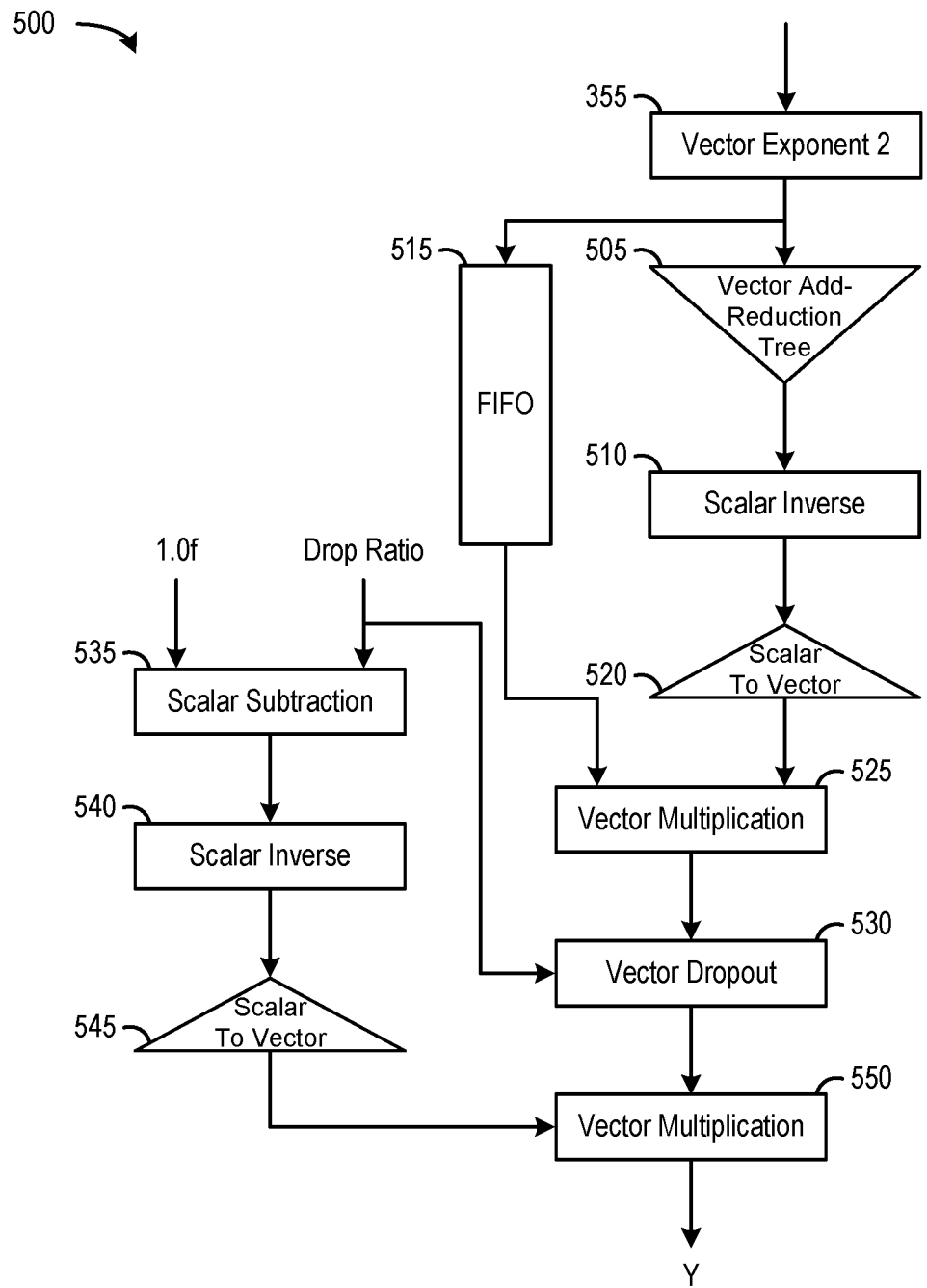
FIG. 5 illustrates another portion on of a data path of a softmax function according to some embodiments.

FIG. 5 illustrates another portion on of a data path 500 of a softmax function according to some embodiments. In some embodiments, data path 500 can be a data path for a portion of a softmax 235. For this example, data path 500 implements how the denominator is determined in formula (6), the numerator by the denominator in formula (6), and the post-dropout scaling provided in equation (4). As depicted in FIG. 5, data path 500 includes vector exponent 2 355, vector add-reduction tree 505, scalar inverse 510, FIFO buffer 515, scalar to vector 520, vector multiplication 525, vector dropout 530, scalar subtraction 535, scalar inverse 540, scalar to vector 545, and vector multiplication 550. In this example, vector exponent 2 355, vector add-reduction tree 505, scalar inverse 510, FIFO buffer 515, scalar to vector 520, and vector multiplication 525 implement a portion of softmax 235. Also, vector dropout 530, scalar subtraction 535, scalar to vector 545, and vector multiplication 550 implement the post-dropout scaling of equation (4).

For this example, data path 500 continues from data path 300 with vector exponent 2 355 providing a vector that includes the result of the base 2 exponential operation to vector add-reduction tree 505 and FIFO buffer 515. Vector add-reduction tree 505 adds each element in the received vector and sends the sum to scalar inverse 510. Scalar inverse 510 performs an inverse operation to produce a value of 1/sum where sum is the value received from vector add-reduction tree 505. Next, scalar inverse 510 sends the inversed value to scalar to vector 520. Scalar to vector 520 generates a vector having the same size as the input vector, X Vector shown in FIG. 3. Each element in the generated vector has the value received from scalar inverse 510.

Upon receiving the vector from scalar to vector 520 and the vector from FIFO buffer 515, vector multiplication 525 performs a vector multiplication operation on the vectors. The result is a vector where each element includes the quotient specified in formula (6). Vector multiplication 525 sends this vector to vector dropout 530. Here, vector dropout 530 receives a drop ratio value and the product vector from vector multiplication 525. Vector dropout 530 is configured to use the drop ratio value to perform equation (3) for each element in the product vector. The resulting vector is sent to vector multiplication 550.

Scalar subtraction 535 receives, as inputs, a floating point value of 1.0 and the drop ratio value. Then, scalar subtraction 535 performs a scalar subtraction operation by subtracting the drop ratio value from the floating point value of 1.0. Scalar subtraction 535 sends the difference to scalar inverse 540, which performs an inverse operation to produce a value of 1/(1−drop ratio) Scalar inverse 540 sends this value to scalar to vector 545. Next, scalar to vector 545 generates a vector having the same size as the input vector, X Vector shown in FIG. 3. Each element in the generated vector has the difference value received from scalar inverse 540. Once vector multiplication 550 receives the vector from scalar to vector 545 and the vector from vector dropout 530, vector multiplication 550 performs a vector multiplication operation on these vectors. The output of vector multiplication 550 is a vector of Y values indicated in equation (4).

Figure 6:
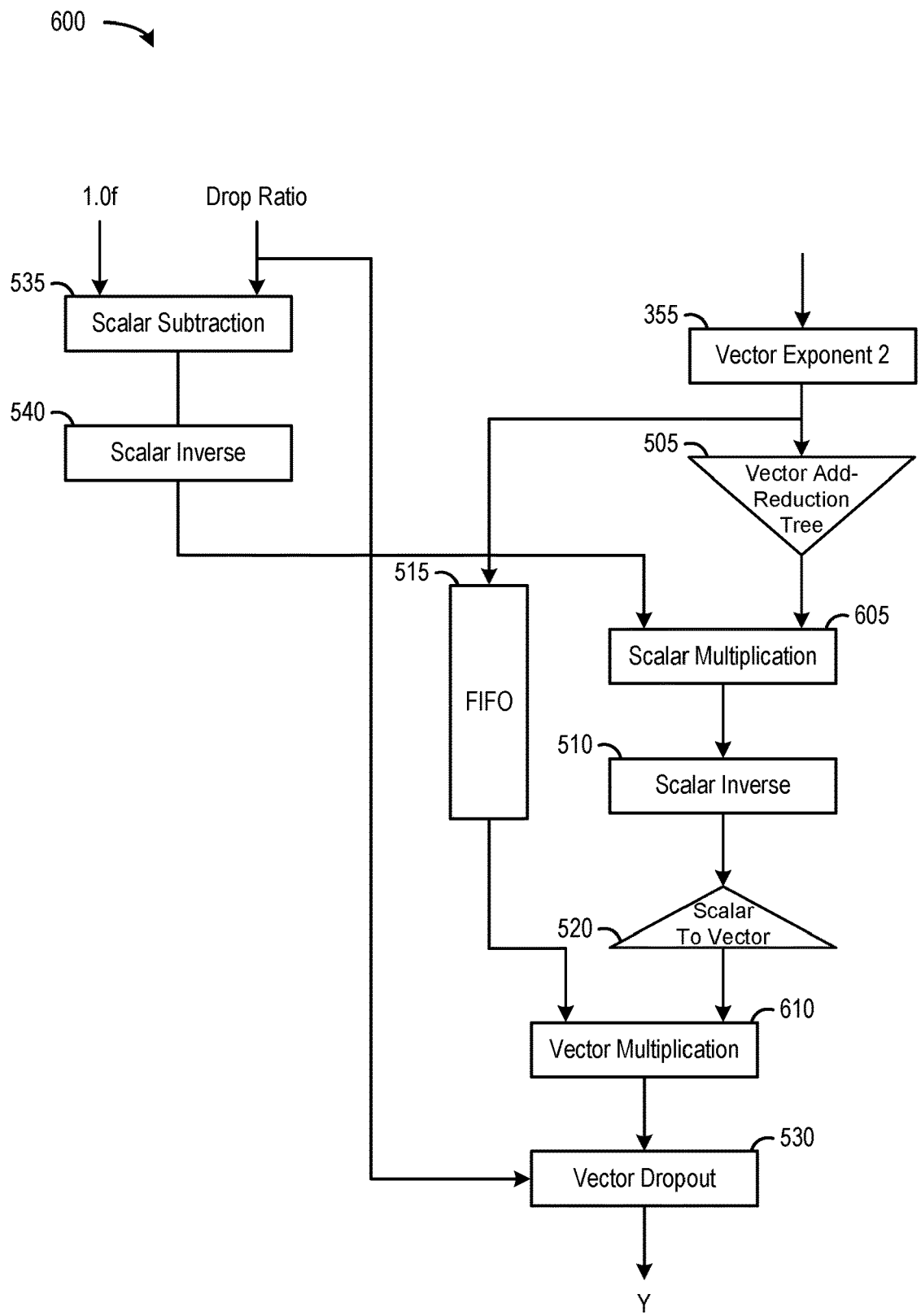
FIG. 6 illustrates the portion of the data path illustrated in FIG. 5 after an operator fusion technique is applied according to another embodiment.

FIG. 6 illustrates the portion of data path 500 after an operator fusion technique is applied according to another embodiment. Referring back to equations (2)-(4), each element can be expressed by the following equation (8):

$$Y_{1,i,j} = \frac{e^{x1_{i,j}-x1_{i,max}}}{(1-\text{drop}_{ratio}) \cdot \Sigma_{j=0}^{Lseq-1} e^{x1_{i,j}-x1_{i,max}}}$$

As illustrated in equation (8), two vector multiplication operations (a first vector multiplication operation multiplying $1/\Sigma_{j=0}^{Lseq-1} e^{x1_{i,j}-x1_{i,max}}$ and a second vector multiplication operation multiplying $1/(1-\text{drop}_{ratio})$) can be fused into a single vector multiplication operation. This single vector multiplication multiplies $1/(1-\text{drop}_{ratio}) \cdot \Sigma_{j=0}^{Lseq-1} e^{x1_{i,j}-x1_{i,max}}$.

As depicted in FIG. 6, data path 600 includes vector exponent 2 355, vector add-reduction tree 505, scalar multiplication 605, scalar inverse 510, FIFO buffer 515, scalar to vector 520, vector multiplication 610, vector dropout 530, scalar subtraction 535, and scalar inverse 540. Data path 600 is similar to data path 500 except for a few modifications. For example, scalar to vector 545 has been replaced with scalar multiplication 605. Here, scalar multiplication 605 receives the sum from vector add-reduction tree 505 and the inverse value from scalar inverse 540 and performs a scalar multiplication of the two values. Next, scalar multiplication 605 provides the product as an input to scalar inverse 510. As another example, vector multiplication 525 and vector multiplication 550 have been combined into a single vector multiplication 610. Vector multiplication 610 is configured to perform a set of vector multiplication operations on the vector received from scalar to vector 520 and the vector received from FIFO buffer 515. The result of the set of vector multiplication operations is sent to vector dropout 530.

In this example, after applying the operator fusing technique to data path 500 to produce data path 600, data path 600 is still functionally identical to data path 500. In other words, the set of output values generated by data path 600 for a given set of input values is the same as the set of output values generated by data path 500 for the same given set of input values. Additionally, implementing data path 600 on hardware (e.g., an ASIC, an FPGA, etc.) uses less computing density compared to implementing data path 500 on the same hardware. In some embodiments where the hardware is an FPGA, data path 600 can be implemented on the FPGA by using a software application operating on a computing device to program data path 600 onto the FPGA.

Figure 7:
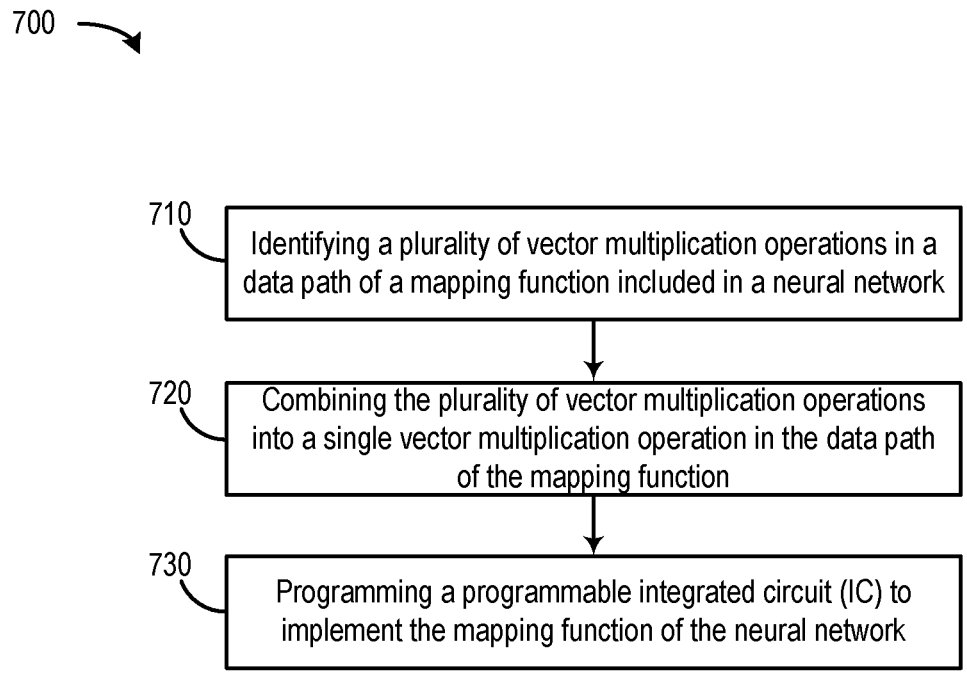
FIG. 7 illustrates a process for fusing operators according to some embodiments.

FIG. 7 illustrates a process 700 for fusing operators according to some embodiments. In some embodiments, process 700 can be performed by a user of a software application operating on a computing device to program a data path (e.g., data path 400, data path 600, etc.) onto an FPGA to implement a softmax function in a transformer neural network model. In some embodiments, process 700 may be performed automatically by the software application.

Process 700 begins by identifying, at 710, a plurality of vector multiplication operations in a data path of a mapping function included in a neural network. Referring to FIG. 3 as an example, process 700 can identify vector multiplication 320 and vector multiplication 350 in data path 300. Referring to FIG. 5 as another example, process 700 may identify vector multiplication 525 and vector multiplication 550 in data path 500.

Next, process 700 combines, at 720, the plurality of vector multiplication operations into a single vector multiplication operation in the data path of the mapping function. Referring to FIGS. 3 and 4 as an example, process 700 can combine vector multiplication 320 and vector multiplication 350 into a single vector multiplication 410 in data path 400. Referring to FIGS. 5 and 6 as another example, process 700 may combine vector multiplication 525 and vector multiplication 550 into a single vector multiplication 610 in data path 600.

Finally, process 700 programs, at 730, a programmable integrated circuit (IC) to implement the mapping function of the neural network. Referring to FIG. 4 as an example, process 700 can program data path 400 onto an FPGA. Referring to FIG. 6 as another example, process 700 may similarly program data path 600 onto an FPGA.

Figure 8:
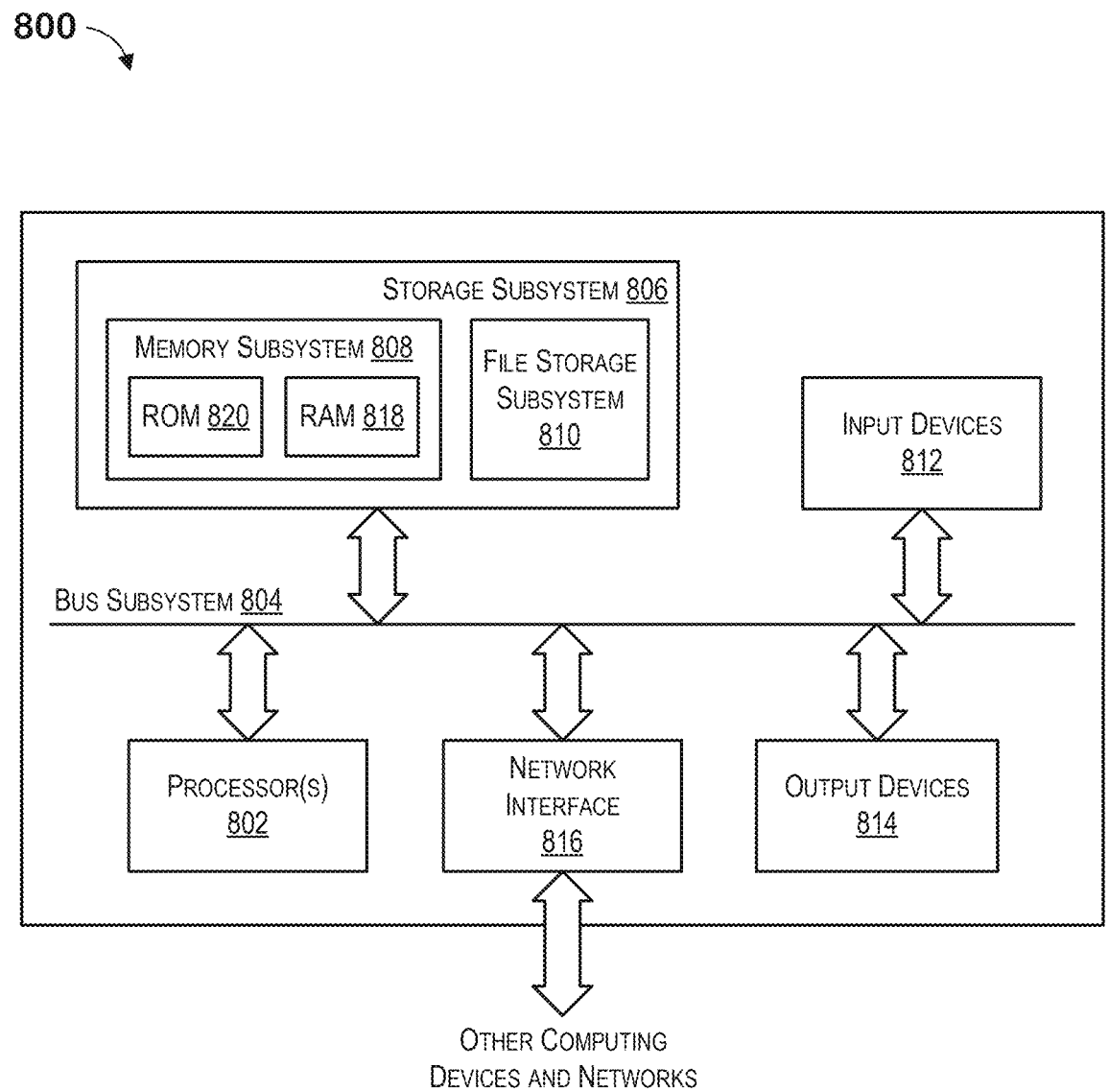
FIG. 8 depicts a simplified block diagram of an example computer system according to some embodiments.

The techniques describe above may be implemented in a wide range of computer systems configured to process neural networks. FIG. 8 depicts a simplified block diagram of an example computer system 800, which can be used to implement the techniques described in the foregoing disclosure. For instance, computer system 800 may be used to program data path 400 and data path 600 onto an FPGA to implement a softmax function in a transformer neural network model. As shown in FIG. 8, computer system 800 includes one or more processors 802 that communicate with a number of peripheral devices via a bus subsystem 804. These peripheral devices may include a storage subsystem 806 (e.g., comprising a memory subsystem 808 and a file storage subsystem 810) and a network interface subsystem 816. Some computer systems may further include user interface input devices 812 and/or user interface output devices 814.

Bus subsystem 804 can provide a mechanism for letting the various components and subsystems of computer system 800 communicate with each other as intended. Although bus subsystem 804 is shown schematically as a single bus, alternative embodiments of the bus subsystem can utilize multiple busses.

Network interface subsystem 816 can serve as an interface for communicating data between computer system 800 and other computer systems or networks. Embodiments of network interface subsystem 816 can include, e.g., Ethernet, a Wi-Fi and/or cellular adapter, a modem (telephone, satellite, cable, ISDN, etc.), digital subscriber line (DSL) units, and/or the like.

Storage subsystem 806 includes a memory subsystem 808 and a file/disk storage subsystem 810. Subsystems 808 and 810 as well as other memories described herein are examples of non-transitory computer-readable storage media that can store executable program code and/or data that provide the functionality of embodiments of the present disclosure.

Memory subsystem 808 includes a number of memories including a main random access memory (RAM) 818 for storage of instructions and data during program execution and a read-only memory (ROM) 820 in which fixed instructions are stored. File storage subsystem 810 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 800 is illustrative and many other configurations having more or fewer components than system 800 are possible.

Figure 9:
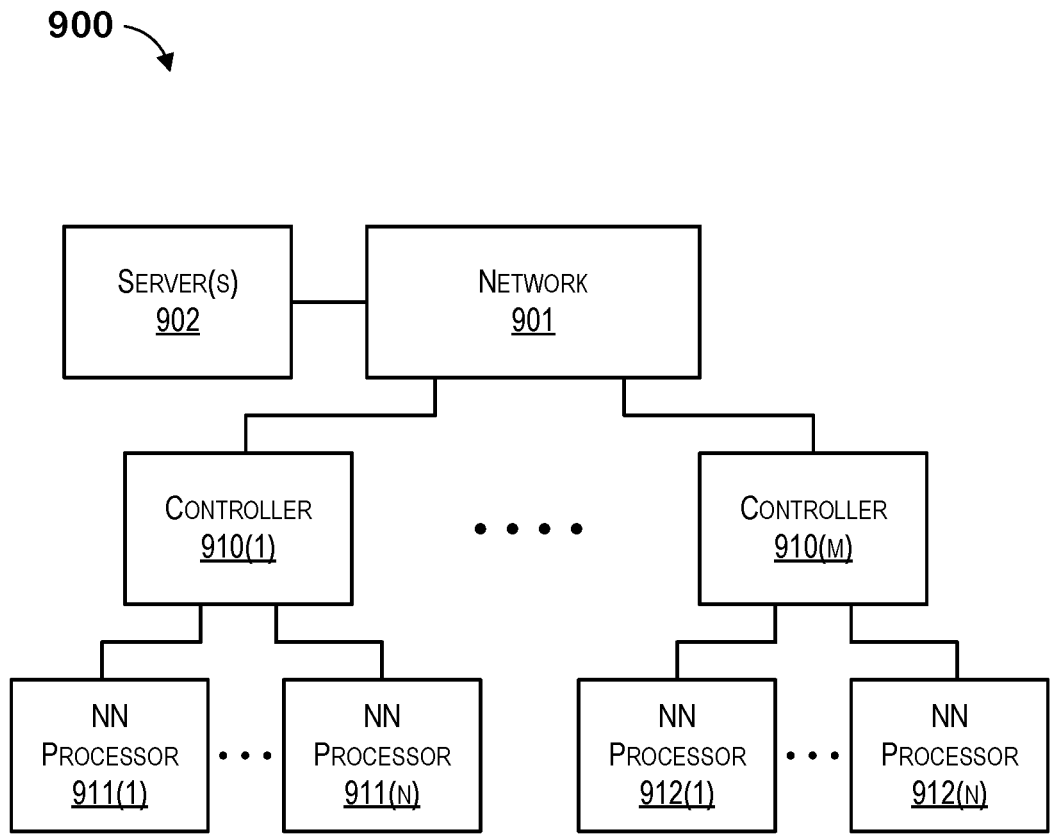
FIG. 9 illustrates a neural network processing system according to some embodiments.

FIG. 9 illustrates a neural network processing system according to some embodiments. In various embodiments, neural networks according to the present disclosure may be implemented and trained in a hardware environment comprising one or more neural network processors. A neural network processor may refer to various graphics processing units (GPU) (e.g., a GPU for processing neural networks produced by Nvidia Corp®), field programmable gate arrays (FPGA) (e.g., FPGAs for processing neural networks produced by Xilinx®), or a variety of application specific integrated circuits (ASICs) or neural network processors comprising hardware architectures optimized for neural network computations, for example. In this example environment, one or more servers 902, which may comprise architectures illustrated in FIG. 8 above, may be coupled to a plurality of controllers 910(1)-910(M) over a communication network 901 (e.g. switches, routers, etc.). Controllers 910(1)-910(M) may also comprise architectures illustrated in FIG. 8 above. Each controller 910(1)-910(M) may be coupled to one or more NN processors, such as processors 911(1)-911(N) and 912(1)-912(N), for example. NN processors 911(1)-911(N) and 912(1)-912(N) may include a variety of configurations of functional processing blocks and memory optimized for neural network processing, such as training or inference. The NN processors are optimized for neural network computations. Server 902 may configure controllers 910 with NN models as well as input data to the models, which may be loaded and executed by NN processors 911(1)-911(N) and 912(1)-912(N) in parallel, for example. Models may include layers and associated weights as described above, for example. NN processors may load the models and apply the inputs to produce output results. NN processors may also implement training algorithms described herein, for example.

FURTHER EXAMPLE EMBODIMENTS

In various embodiments, the present disclosure includes systems, methods, and apparatuses for fusing operators for neural network hardware accelerators. The techniques described herein may be embodied in non-transitory machine-readable medium storing a program executable by a computer system, the program comprising sets of instructions for performing the techniques described herein. In some embodiments, a system includes a set of processing units and a non-transitory machine-readable medium storing instructions that when executed by at least one processing unit in the set of processing units cause the at least one processing unit to perform the techniques described above. In some embodiments, the non-transitory machine-readable medium may be memory, for example, which may be coupled to one or more controllers or one or more artificial intelligence processors, for example.

The following techniques may be embodied alone or in different combinations and may further be embodied with other techniques described herein.

For example, in one embodiment, the present disclosure includes a method comprising identifying a plurality of vector multiplication operations in a data path of a mapping function included in a neural network; combining the plurality of vector multiplication operations into a single vector multiplication operation in the data path of the mapping function; and programming a programmable integrated circuit (IC) to implement the mapping function of the neural network.

In one embodiment, the mapping function is configured to receive a first plurality of values and map the first plurality of values to a second plurality of values. Each value in the second plurality of values falls within a defined range of values.

In one embodiment, the first plurality of values is a first vector of values. The second plurality of values is a second vector of values.

In one embodiment, a sum of values in the second vector of values is equal to 1.

In one embodiment, the defined range of values is a range of values between 0 and 1.

In one embodiment, the mapping function is a softmax function.

In one embodiment, the neural network is a transformer neural network comprising a set of encoders. Each encoder in the set of encoders comprising a set of attention layers. The softmax function is included in an attention layer in the set of attention layers of an encoder in the set of encoders.

In one embodiment, the programmable IC is a field-programmable gate array (FPGA).

In one embodiment, combining the plurality of vector multiplication operations into the single vector multiplication operation in the data path of the mapping function does not change a set of output values generated by the data path for a given set of input values.

In one embodiment, combining the plurality of vector multiplication operations into the single vector multiplication operation in the data path of the mapping function comprises adding a scalar multiplier.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method comprising:
identifying a plurality of vector multiplication operations in a data path of a mapping function included in a neural network;
combining the plurality of vector multiplication operations into a single vector multiplication operation in the data path of the mapping function by adding a scalar multiplier representing a combined scaling factor for the plurality of vector multiplication operations; and
programming a programmable integrated circuit (IC) to implement the mapping function of the neural network.

2. The method of claim 1, wherein the mapping function is configured to receive a first plurality of values and map the first plurality of values to a second plurality of values, wherein each value in the second plurality of values falls within a defined range of values.

3. The method of claim 2, wherein the first plurality of values is a first vector of values, wherein the second plurality of values is a second vector of values.

4. The method of claim 3, wherein a sum of values in the second vector of values is equal to 1.

5. The method of claim 2, wherein the defined range of values is a range of values between 0 and 1.

6. The method of claim 1, wherein the mapping function is a softmax function.

7. The method of claim 6, wherein the neural network is a transformer neural network comprising a set of encoders, each encoder in the set of encoders comprising a set of attention layers, wherein the softmax function is included in an attention layer in the set of attention layers of an encoder in the set of encoders.

8. The method of claim 1, wherein combining the plurality of vector multiplication operations into the single vector multiplication operation in the data path of the mapping function does not change a set of output values generated by the data path for a given set of input values.

9. The method of claim 1, wherein the programmable IC is a field-programmable gate array (FPGA).

10. A non-transitory machine-readable medium storing a program executable by at least one processing unit of a device, the program comprising sets of instructions for:
identifying a plurality of vector multiplication operations in a data path of a mapping function included in a neural network;
combining the plurality of vector multiplication operations into a single vector multiplication operation in the data path of the mapping function by adding a scalar multiplier representing a combined scaling factor for the plurality of vector multiplication operations;
programming a programmable integrated circuit (IC) to implement the mapping function of the neural network.

11. The non-transitory machine-readable medium of claim 10, wherein the mapping function is configured to receive a first plurality of values and map the first plurality of values to a second plurality of values, wherein each value in the second plurality of values falls within a defined range of values.

12. The non-transitory machine-readable medium of claim 11, wherein the first plurality of values is a first vector of values, wherein the second plurality of values is a second vector of values.

13. The non-transitory machine-readable medium of claim 12, wherein a sum of values in the second vector of values is equal to 1.

14. The non-transitory machine-readable medium of claim 11, wherein the defined range of values is a range of values between 0 and 1.

15. A system comprising:
a set of processing units; and
a non-transitory machine-readable medium storing instructions that when executed by at least one processing unit in the set of processing units cause the at least one processing unit to:
identify a plurality of vector multiplication operations in a data path of a mapping function included in a neural network;
combine the plurality of vector multiplication operations into a single vector multiplication operation in the data path of the mapping function by adding a scalar multiplier representing a combined scaling factor for the plurality of vector multiplication operations;
program a programmable integrated circuit (IC) to implement the mapping function of the neural network.

16. The system of claim 15, wherein the mapping function is a softmax function.

17. The system of claim 16, wherein the neural network is a transformer neural network comprising a set of encoders, each encoder in the set of encoders comprising a set of attention layers, wherein the softmax function is included in an attention layer in the set of attention layers of an encoder in the set of encoders.

18. The system of claim 15, wherein combining the plurality of vector multiplication operations into the single vector multiplication operation in the data path of the mapping function does not change a set of output values generated by the data path for a given set of input values.

* * * * *